Patented Oct. 23, 1945

2,387,694

UNITED STATES PATENT OFFICE 2,387,694

TREATMENT OF DRILLING FLUIDS

Truman B. Wayne, Houston, Tex.

No Drawing. Application March 27, 1936,
Serial No. 71,179

14 Claims. (Cl. 252—8.5)

This invention relates generally to well drilling and particularly to the treatment of drilling fluids or mud which are circulated in the bore hole in the process of rotary drilling. As to common subject matter this application is a continuation in part of my prior copending application Serial No. 24,083, filed May 29, 1935.

In the practice of rotary drilling, such as is carried out in the drilling of oil and gas wells, a mud or clay laden fluid is circulated in the bore hole in order to remove the cuttings and accomplish other purposes. Such a drilling fluid may contain, in addition to water, a solid component such as a drilling clay, bentonite, etc., including a gel-forming component. As the drilling progresses and the hole is made, strata of various formations are encountered and consequently the mud may become contaminated with various constituents which do not readily deposit in the settling ditches. Some of these constituents which are taken up from the formations through which the drilling is progressing may themselves have the effect of increasing the viscosity of the mud, while others may have the effect of neutralizing such viscosity reducing agents as may have been added to the mud.

Various agents have heretofore been employed for reducing the viscosity of the mud employed in rotary drilling, but in most instances it has been necessary to continuously add such viscosity reducing agents to the mud as it is continually recirculated through the bore hole. This is possibly due to the fact that constituents taken up from the formation and retained in the mud have a neutralizing influence upon the viscosity reducing agents heretofore employed and consequently the viscosity reducing agents must be continuously applied, not only to fresh mud but to previously treated mud as well.

The object of the present invention, generally stated, is to provide in the treatment of a well drilling fluid or mud, a mud treating agent having improved characteristics and particularly one which is more efficient in reducing the viscosity of the mud than those heretofore employed.

Another object of the present invention is to provide in such treatment, a mud treating agent capable of reacting with the alkaline earth constituents taken up from the formation and producing colloidal compounds thereof under conditions such that they have little or no influence upon the characteristics of the mud.

A more specific object of the invention is to provide in such treatment, a mud treating agent of the type referred to in which the common organic protectives heretofore used in this connection are activated and maintained active to an extent such as to improve their efficiency.

Other objects will become apparent to those skilled in the art when the following description is read.

In accordance with the present invention a mud treating agent is provided and employed which has the effect of activating the feebly acid organic compounds, such as humic acid compounds, present in all surface clays and in many clays of deeper formation as well as upon such feebly acid organic compounds or the commonly used protectives which may have been naturally or artificially introduced into the mud. Such activation increases the activity of these protectives at the surface of the gel particles in the mud and enhances the well known protective influence of this class of organic substances. Moreover, the present invention contemplates the use of a mud treating agent containing a radical which will react with calcium, magnesium, iron and aluminum salts so as to produce colloidal reaction products. The present invention particularly contemplates a mud treating agent containing a phosphate radical in such condition that, while the compound is available for reaction with the alkaline earth salts, which may have been taken up by the mud, in order to neutralize their influence upon the mud, the compound is, nevertheless, one which accomplishes this result without, at the same time, substantially altering the pH value of the mud. For example the metaphosphoric acid radical produces advantageous results when used as a mud treating agent. The metaphosphoric acid radical apparently activates such organic protectives as may be present naturally or artificially in the mud to such an extent that the latter are considerably more effective in reducing the viscosity of the mud, both initially and after the mud has been in use for several hours, than would otherwise be the case. For instance, an admixture of sodium hexametaphosphate and a suitable tannin compound is considerably more effective, both initially and after the mud has been in use for several hours than a corresponding mixture in which mono or disodium-orthophosphate has been used instead of the metaphosphate. This difference in efficiency is particularly noticeable when the drilling fluid contains muds derived from calcareous shales. The metaphosphate should have the property of acting as a viscosity-reducing agent when added to a drilling fluid or mud and should therefore be sufficiently soluble in the fluid under the conditions encountered in well drilling to accomplish that result.

Metaphosphoric acid and its salts and esters with hydroxy compounds of the tannin type produce particularly advantageous results. This may be attributable to the fact that metaphosphoric acid compounds may be feebly acidic when first introduced into the mud, and the phosphate radical or even the carboxyl or phenyl radicals present in the composition or which become available through hydrolysis or ionization may react with the alkaline earth constituents present in the mud. This reaction is accomplished without substantial variation of the pH value of the mud, as the reagents themselves do not depend on the deflocculating action of free alkali and thus obviate the swelling and hydration of the clay particles which almost invariably follows the use of alkaline treating agents, or those which liberate alkaline sodium compounds in their reactions with the alkaline earth constituents of the mud. The use of a strongly acid compound, unless used in an amount sufficient to denature most of the colloids of the mud, would cause flocculation and thickening.

In the case of the esters of acid and hydroxy carboxylic acids such as as gallic, and the like, it is possible that the alkaline earth constituents in the mud react with the carboxyl group or its soluble sodium, ammonium, or hydroxyamine salts.

With the pH value of the mud maintained substantially constant, notwithstanding the reactions which may be going on to neutralize the effect of the alkaline earth constituents taken up by them, the effect of the usual organic protectives present, naturally or artificially, in the mud is unmitigated.

The sodium metaphosphate of commerce is suitable for use in accordance with the present invention, notwithstanding the fact that some grades may contain added sodium carbonate or trisodium phosphate. The sodium metaphosphate employed may be one consisting largely of the hexa-polymer but containing small percentages of sodium pyrophosphate produced as a by-product during manufacture or which may have been added to adjust the pH value of the commercial product. Metaphosphoric acid in anhydrous form may be employed but, due to the difficulties in preventing hydration of this material, it is more convenient to employ a compound thereof.

The esters of metaphosphoric acid are particularly well suited for use in accordance with the present invention. These esters may be prepared by first isolating the free metaphosphoric acid in any suitable manner and then esterifying the anhydrous or nearly anhydrous free acid with an organic hydroxy body by any of the well known procedures used in the preparation of organic esters. The acid and organic hydroxy body may, for instance, be esterified by heating them for several hours below the decomposition point of the hydroxy bodies employed and a suitable catalyst may be employed to hasten the reaction. If desired, dry hydrogen chloride gas may be passed through the reaction mixture to accelerate the esterification and carry it more nearly to completion. Suitable inert solvents may also be employed for expediting the reaction and in fact any of the expedients occuring to those skilled in the art of organic reactions and synthesis may be employed.

Esters of metaphosphoric acid with poly-hydroxy phenols which are amphoteric in nature, such as pyrogallol, resorcinol, phloroglucinol, hydroxyquinol, and catechol; esters, glucosides, and anhydrous salts of gallic, protocatechuic, digallic, ellagic, and similar polyhydroxy aromatic acids having free hydroxy groups, are particularly suitable for use in accordance with the present invention. Esters of metaphosphoric acid with fully soluble polyhydric alcohols such as glycerol, glycol, and arabitol are suitable but the esters of metaphosphoric acid with tannins and tannin-like bodies commend themselves as more desirable from a practical standpoint.

While the mud treating agents of the present invention may be applied to the mud in a dry condition, it is ordinarily more convenient to apply them in a convenient solution which may be added to the mud at a suitable point in the circulatory system. For instance, the treating agent may be added to the mud in the usual ditch just beyond the point where mud from the well is discharged or at any other suitable point before the mud reaches the suction pumps which return the stream to the bore hole. Frequently, however, it is advantageous to admit the treating agent directly into the pump suction as very efficient mixing is accomplished in this manner.

As a specific example illustrating the use of the treating compounds in accordance with the present invention, sodium hexametaphosphate may be used. For instance, ten pounds of a dry mixture prepared from nine parts of powdered sodium hexametaphosphate and one part of soda ash may be dissolved in fifty gallons of water. This solution may be slowly fed into the mud in such manner that the entire amount of treating agent has been introduced into the mud by the time first returns of treated mud reach the point of application. The quantity stated in this example is adequate for the treatment of 250 barrels of drilling mud with the result that the viscosity of mud was reduced from 57 centipoises (before treatment) to 26 centipoises (after treatment).

The mixture just described was employed in the treatment of a mud from the Fittstown area of Oklahoma using two parts of a 10% solution of the dry mixture, described above, to a thousand parts of mud. The initial viscosity of the mud was 51.5 centipoises and the viscosity, after treatment, was 22.5 centipoises while the gel strength of the colloidal matter in the mud was greatly reduced.

Another example of mud from the Fittstown area of Oklahoma which had been previously untreated was treated with two parts per a thousand of a 10% isopropanol solution of an ester prepared from molecular proportions of phosphorus pentoxide and sodium tannate. The initial viscosity of 51.5 centipoises was thereby reduced to 24.0 centipoises.

The mud last mentioned is illustrative of one in which satisfactory results have not been obtainable wth the usual alkaline caustic soda and tannin mixtures or mixtures of these with other customary materials.

As a further example illustrating the effect of the compounds of the present invention upon a ten pound mud prepared from corings derived from the Yegua shale formation of the Texas Gulf coast area, such a mud was treated with an ester prepared from three molecules of anhydrous metaphosphoric acid and one molecule of the anhydrous sodium salt of gallic acid. This agent also used as a 10% alcoholic solution in the proportion of two parts for each thousand parts of mud. The initial viscosity of 57 centipoises was reduced to 26 centipoises by this treatment.

While in the foregoing specific examples the effect of the treating agents of the present invention used alone has been illustrated, it will be understood that other mud treating agents heretofore employed and having a particular effect upon the mud may be employed together with the compounds of the present invention. For instance, alkaline sodium tannates, sodium orthophosphates, sodium silicates, etc. which have a buffering action may be used together with the compounds of the present invention. In most instances, however, due to the relatively small amounts of the treating agents of the present invention required to produce efficient results, it is desirable to use the agents of the present invention unsupplemented by agents such as those just mentioned.

While in the foregoing disclosure reference has been made to various theories of action of the compounds contemplated by this invention and the reactions taking place in the mud pursuant to treatment have been referred to, it is to be understood that while the ultimate effect of the compounds has been proved, the specific actions and reactions herein suggested are speculative to the extent that they are not ascertained with certainty, and hence the invention is not to be interpreted as being limited by any theoretical consideration or action as herein suggested for the purpose of facilitating an understanding of the disclosure.

From the foregoing description it is apparent that the present invention accomplishes its objects and provides a treatment for drilling muds in which smaller quantities of the agent are necessary to produce the desired effect than of those agents heretofore employed for this purpose and that the effect of the agents of the present invention is a prolonged effect as distinguished from the more or less temporary effect of the agents heretofore used.

While in the foregoing disclosure of the present invention reference has been made to various specific examples of the mud treating agents in accordance with the present invention, it is not to be understood that the present invention is limited to those particular agents and combinations of agents herein specifically described, but on the contrary the features of the present invention may be applied generally and various modifications may be made in the formulae without departing from the spirit of this invention. It is to be distinctly understood, therefore, that such modifications and the use of such individual features and subcombinations of features as present themselves to those skilled in the art without departing from the spirit of this invention are, although not specifically described herein, contemplated by and within the scope of the appended claims.

Having thus described the invention what is claimed is:

1. In the art of drilling and controlling wells in which mud is circulated in the bore hole the process comprising, treating the mud with an agent containing the metaphosphate radical.

2. In the art of drilling and controlling wells in which mud is circulated in the bore hole the process comprising, treating the mud with a salt of metaphosphoric acid.

3. In the art of drilling and controlling wells in which mud is circulated in the bore hole, the process comprising, treating the mud with an agent containing the metaphosphate radical and an organic protective compound.

4. In the art of drilling and controlling wells in which mud containing hydrated clay colloids, organic protective compounds, and mineral salts, the process of reducing viscosity of the mud, comprising, treating the mud with an agent containing reactive metaphosphate radical.

5. In the art of drilling and controlling wells in which mud is circulated in the bore hole, the process comprising, treating the mud with sodium metaphosphate.

6. A drilling mud comprising clay, water, an alkali metal hexametaphosphate, and a lyophile colloid.

7. A drilling mud in the form of a thixotropic dispersion comprising clay, water and an alkali metal hexametaphosphate in small amount sufficient to render the drilling mud substantially immune to deterioration by base exchange.

8. The method of substantially immunizing a thixotropic drilling mud against deterioration by base exchange which comprises adding thereto an alkali metal hexametaphosphate.

9. A method of maintaining the thixotropic character of a drilling mud containing bentonite clays, which comprises adding thereto an alkali metal hexametaphosphate.

10. A method of converting a drilling mud comprising a dispersion of a bentonite clay in water into a thixotropic drilling mud, which comprises adding thereto an alkali metal hexametaphosphate.

11. A drilling mud comprising clay, water and sufficient sodium hexametaphosphate to control the viscosity of the mud.

12. The method of controlling the gelation and viscosity of oil well drilling muds containing calcium and magnesium and other metal salts, which comprises adding an alkali metal polymetaphosphate capable of sequestering the said calcium and magnesium and other metal salts into a soluble, substantially non-ionized condition in said drilling mud.

13. A drilling mud for well drilling containing sodium poly-metaphosphate in solution whereby calcium, magnesium and other metal salts dissolved therein are immediately locked into a soluble, substantially non-ionized condition.

14. In the drilling of oil and gas wells, the steps in controlling the gelation and viscosity of the drilling mud which comprises adding thereto sodium poly-metaphosphate.

TRUMAN B. WAYNE.

CERTIFICATE OF CORRECTION.

Patent No. 2,387,694.  October 23, 1945.

TRUMAN B. WAYNE.

It is hereby certified that error appears in the printed specification of the above numbered patent requiring correction as follows: Page 2, first column, line 26, for the words "of acid" read --of metaphosphoric acid--; page 3, second column, line 23, after "metaphosphate." insert the following as claim 6 -

--A drilling mud comprising a dispersion clay in an aqueous solution of an alkali metal hexametaphosphate.--;

and for the claims now numbered "6", "7", "8", "9", "10", "11", "12", "13" and "14" read --7--, --8--, --9--, --10--, --11--, --12--, --13--, --14-- and --15-- respectively; in the heading to the printed specification, line 6, for "14 Claims" read --15 Claims--; and that the said Letters Patent should be read with this correction therein that the same may conform to the record of the case in the Patent Office.

Signed and sealed this 18th day of December, A. D. 1945.

Leslie Frazer (Seal)  First Assistant Commissioner of Patents.